United States Patent
Poornachandran et al.

(10) Patent No.: US 9,705,618 B1
(45) Date of Patent: Jul. 11, 2017

(54) SYSTEMS, METHODS AND DEVICES FOR PUBLIC ANNOUNCEMENTS

(71) Applicant: INTEL CORPORATION, Santa Clara (CA)

(72) Inventors: Rajesh Poornachandran, Portland, OR (US); Rita Wouhaybi, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/975,074

(22) Filed: Dec. 18, 2015

(51) Int. Cl.
| | | |
|---|---|---|
| H04H 40/00 | (2009.01) | |
| H04H 20/71 | (2008.01) | |
| H04H 60/70 | (2008.01) | |
| H04H 60/46 | (2008.01) | |

(52) U.S. Cl.
CPC ............ *H04H 20/71* (2013.01); *H04H 60/46* (2013.01); *H04H 60/70* (2013.01)

(58) Field of Classification Search
USPC ................ 455/3.01–3.06, 550.1, 456.1–457, 455/41.1–41.3
See application file for complete search history.

(56) References Cited

U.S. PATENT DOCUMENTS

| | | | |
|---|---|---|---|
| 9,093,062 B2 * | 7/2015 | Daye ..................... | G10L 15/005 |
| 2004/0096050 A1 | 5/2004 | Das et al. | |
| 2007/0055496 A1 | 3/2007 | Seto | |
| 2008/0294424 A1 | 11/2008 | Naito et al. | |
| 2009/0180599 A1 | 7/2009 | Jackowitz et al. | |
| 2009/0204901 A1 | 8/2009 | Dharmaji et al. | |
| 2010/0299142 A1 * | 11/2010 | Freeman ............ | G06Q 30/0241 704/9 |
| 2011/0022606 A1 | 1/2011 | Mason | |
| 2012/0064820 A1 * | 3/2012 | Bemmel .............. | G08G 1/0141 455/3.02 |
| 2015/0142431 A1 * | 5/2015 | Daye ..................... | G10L 15/005 704/231 |
| 2016/0142453 A1 * | 5/2016 | Paladugu ............ | H04L 65/1066 709/204 |
| 2016/0232776 A1 * | 8/2016 | Reeser ................... | G06Q 30/04 |

OTHER PUBLICATIONS

"Amazon CloudFront—Dynamic Content Delivery", http://aws.amazon.com/cloudfront/dynamic-content/, 9 pages.

(Continued)

*Primary Examiner* — Fayyaz Alam
(74) *Attorney, Agent, or Firm* — Stoel Rives LLP (57) ABSTRACT

A public addressing system can identify user preferences including language, volume, and method of delivery to provide improved content in a given geographical area using perceptual computing techniques. The system can also support the use of personal devices including wearables in order to deliver private personalized messages discreetly. For example, one embodiment of a public announcement system gathers and aggregates demographic data of a population in a public place. The public announcement system creates inferences from this data to predict content delivery preferences, such as a sequence of languages or delivery characteristics (e.g., speech rate, content and volume). The delivery preferences can be ranked and then a recommendation for a public announcement provided.

23 Claims, 6 Drawing Sheets

(56) References Cited

OTHER PUBLICATIONS

"Linguistic Profiling Entry from Wikipedia", http://en.wikipedia.org/wiki/Linguistic_profiling, pulled Oct. 30, 2015, 10 pages.
"Speech Accent Archive: Browse", http://accent.gmu.edu/browse.php, 1 page.
Intel Developer Zone, "Intel Perceptual Computing SDK Installer", https://software.intel.com/en-us/articles/intel-perceptual-computing-sdk-2013, pulled Oct. 30, 2015, 2 pages.
Lu, et al., "Ethnicity Identification from Face Images", http://visgraph.cs.ust.hk/biometrics/Papers/Face/SPIE_04_2004.pd, 10 pages.
Lu, et al., "Multimodal Facial Gender and Ethnicity Identification", http://www.cse.msu.edu/rgroups/biometrics/Publications/Face/LuChe nJain_3DGenderEthn_ICBA06.pdf, 8 pages.
Pivotel (PTY) Ltd, "Facial Profiling", http://pivotel.net/faicial-profiling/ via https://web.archive.org/web/20150219233908/http://pivotel.net/faicial-profiling/, pulled Oct. 30, 2015, 3 pages.
Watanaprakornkul, et al., "Accent Classification", http://cs229.stanford.edu/proj2010/WatanaprakomkulEksombatchaiC hien-AccentClassification.pdf, 5 pages.
PCT/US2016/059090, International Search Report and Written Opinion, Jan. 31, 2017, 15 pages.

\* cited by examiner

SYSTEMS, METHODS AND DEVICES FOR PUBLIC ANNOUNCEMENTS

TECHNICAL FIELD

The present disclosure relates to public announcement systems and more specifically to dynamically determining public announcement preferences of a population.

DETAILED DESCRIPTION OF PREFERRED EMBODIMENTS

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Techniques, apparatus and methods are disclosed that enable a public addressing system that can identify user preferences including language, volume, and method of delivery, to provide improved content in a given geographical area using perceptual computing techniques. The system can also support the use of personal devices including wearables in order to deliver private personalized messages discreetly.

For example, the public announcement system can be placed in an airport. Input sources can include IoT sensing devices such as cameras, microphones, etc. deployed throughout an airport. Users can opt in to share their preferences via their devices (e.g., wearables), passenger information from airlines, and regional privacy laws/regulations for a given geographic location and/or political area. Airline information management systems can provide information such as passenger home information, destination, transit points, historical travel information, passenger preferences, etc.

In one embodiment, a public announcement system gathers and aggregates demographic data of a population in a public place. The public announcement system creates inferences from this data to predict content delivery preferences, such as a sequence of languages and delivery characteristics (e.g., speech rate, content and volume). The delivery preferences can be ranked and then a recommendation for a public announcement provided.

As the public announcement system uses inferences, the public announcement system can make incorrect inferences. For example, the public announcement system might identify someone of Indian descent, but the person might actually be a second generation who grew up in Sweden and prefers Swedish. These incorrect inferences can be provided back into the public announcement system as part of adaptive feedback to adjust future inferences. Despite the incorrect inferences, the public announcement system can provide an improvement over existing announcements that deliver messages often in English and an official language of the host country.

In one embodiment, the system uses data from multiple users and aggregates a decision vector. The decision vector can be a set of languages to be used and their priority orders. In some embodiments, multiple vectors can be created for use in different parts of the public space. Aggregation can be based on confidence levels and machine learning. Granularity for dialects can be based on local data that provide clues (for use with inferences) about a language of choice. For example, at an airport, local flight data may provide useful or desired clues about a language of choice. Additionally, the public announcement system can use an adaptive feedback learning capability to improve recommendations.

The public announcement system can be used in several use cases. For example, the public announcement system can be used to identify a user who may look Asian but prefers English as their language of choice. In another example, the public announcement system can accommodate users who expect anonymity and can use a One-Time-Unique-HASH (OTUH) code, as announcements can refer to users via the OTUH code instead of by user name or other personal identifier. In one example, an adaptive feedback engine provides effectiveness data to the public announcement system to adjust inferences based on an effectiveness measurement of an earlier announcement. An example of an effectiveness measurement and response can be a lack of response (e.g., a person did not show up to their gate). To mitigate (via the received adaptive feedback) the system can use a next language based on inference ranking and learn appropriately (e.g., dampen the inference response for the first language). In yet another example, a cultural checker can be used to help the public announcement system to avoid inappropriate words or phrases while performing dynamic language selection and/or translation. In an example, a passenger travel digest (e.g., home airport, current destination airport, past transit points, etc.) improves the confidence levels of inferences. For example, an individual arriving from China may not be Chinese. The individual may have been in China as a transit stopover but may have originated from India. The passenger travel digest can provide additional data to help guide better inferences.

Public announcements (PA) systems are used in many settings. Audio is often the main delivery system and may remain so for some time despite advances in wearables, mobiles and other technologies. Obstacles to adoption of other technologies besides audio can include economic and technology barriers in many underdeveloped countries.

When PA systems are used in diverse settings, such as airports and train stations, it can be difficult to determine a type of content, language, volume and other characteristics for the delivery of announcement information (including audio). Many existing PA systems are statically configured in terms of a prioritization of languages used.

For example, a Chinese flight with 80% of passengers having Chinese passports arrives at Frankfurt Airport. It may be advisable to make announcements in the near vicinity of the exit gate for the flight from China using a Chinese language (such as Mandarin) instead of using German or English, to provide a better user experience.

In another example, an elderly person taking prescription medication doses off in an airport. The elderly person may be unable to respond to audio information, such as an audio announcement calling the elderly person's name. Instead, his wearable device can be in always-listen mode or provide vibrating alerts when an airline is looking for him.

Alternatively, a person making an announcement for the passenger may have mispronounced the passenger's name so badly that it is unrecognizable. However, a unique one-time HASH and/or a unique frequency of noise represent a unique identifier that can be used in announcements without revealing the passenger's information. This distribution allows passengers to retain their privacy (especially for minors), while passengers can clearly and securely get alerted based on their associated unique identifier.

By using these processes, a PA system can identify and/or infer user preferences including language, volume, and method of delivery, to provide improved content in a given geo fence using perceptual computing techniques. The PA system can use personal devices to assist in presenting announcements by receiving preferences and transmitting messages. In one embodiment, the PA system can aggregate data to form announcement preference inferences and combine the inferences with preferences voluntarily provided from individuals. The aggregated data can then be used to provide recommendations regarding public announcement characteristics.

Figure 1:
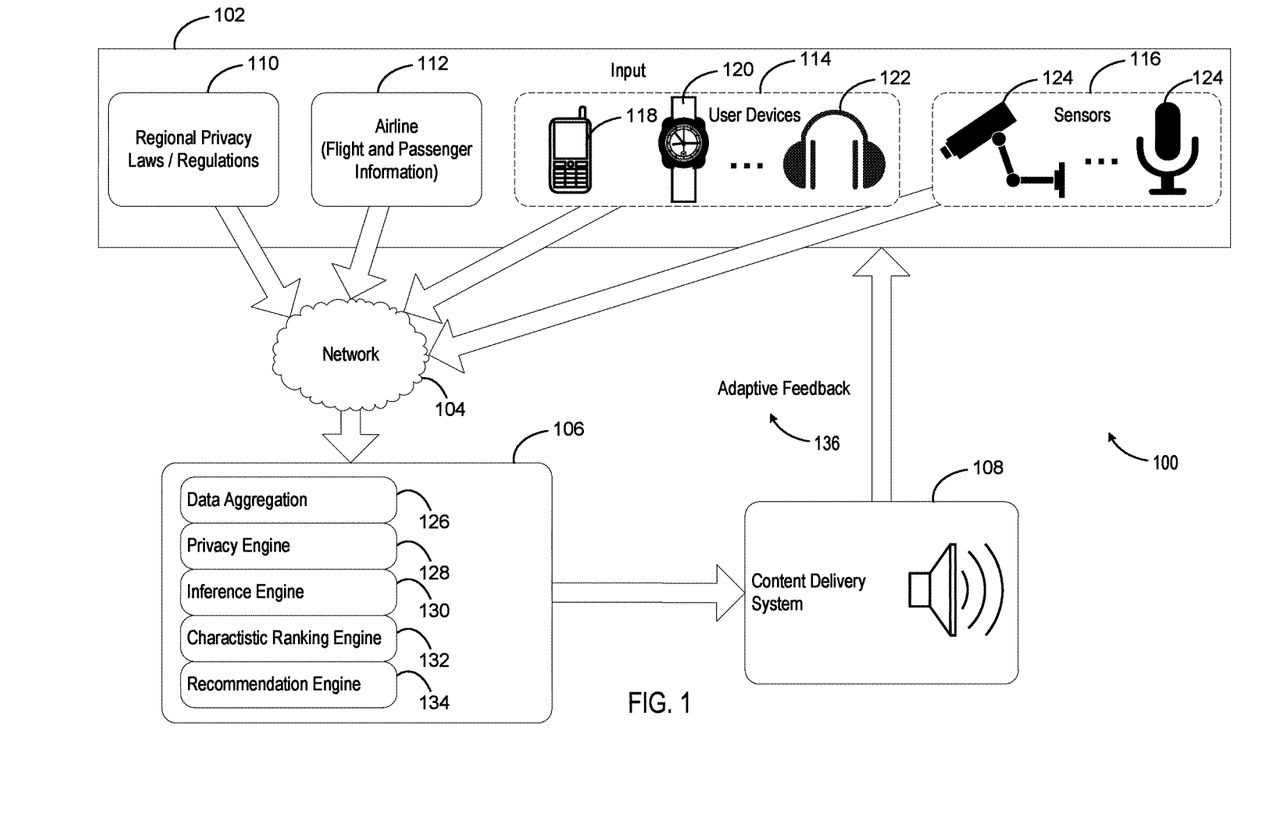
FIG. 1 is a diagram illustrating a public announcement system consistent with embodiments disclosed herein.

FIG. 1 is a diagram illustrating a public announcement system 100. The architecture of the public announcement system includes input interfaces 102 (or means for sensing), a data aggregation engine 126 (or means for aggregating data), a privacy engine 128 (or means for verifying privacy), an inference engine 130 (or means for estimating content delivery preferences), a characteristics ranking engine 132 (or means for sorting content delivery preferences), a recommendation engine 134 (or means for constructing a recommendation and/or transmitting a recommendation), adaptive feedback 136 (or means for providing a success measurement) and content delivery system 108 (or means for delivering content).

Input interfaces can receive data from data feeds, user devices 114 and sensors 116. Data feeds can include population data, such as airline flight and passenger information 112. User devices can store and provide individual preference information through a user device interface. Device interfaces can include support for mobile phones 118, smart devices 120 and wearable technology 122. A sensor input interface can receive data from sensors 116 and Internet of Things (IoT) devices. Sensors can sense information about the population. This information can include video data and audio data from cameras 124 or microphones 124.

Explicit individual preferences can come from different inputs. For example, individuals within a population can opt in to provide their language/notification preference(s) to airline management systems 112 and/or Airport Public Announcement systems. Information sources (regional privacy data 110 and airline management systems 112 can be provided to a public announcement system through data feeds.

Input interfaces 102 can provide input data to a processing system 106 that processes the input data and provides recommendations for a content delivery system. The processing system 106 can include a data aggregation engine 126, a privacy engine 128, an inference engine 130, a characteristics ranking engine 132 and a recommendation engine 134. In some embodiments, an input into one engine can be an output of another engine. For example, input data is processed by the data aggregation engine 126 and output in organized data structures. A privacy engine 128 can operate on the data structures to aid in anonymizing the data within the data structures. An inference engine 130 can operate on the data structures to make inferences about the data. A characteristic ranking engine 132 can operate on the inferences to provide a ranking of announcement characteristics. A recommendation engine 134 can operate on the ranking of announcement characteristics and provide a set of recommendations for distribution of a message. In one embodiment, the data aggregation engine 126 and privacy engine 128 translate sensor, feed and user-provided data into a format that can be operated on by the inference engine 130, characteristic ranking engine 132 and recommendation engine 134.

A data aggregation engine 126 can aggregate data from a variety of input sources, such as through input interface 102. This engine can be communicatively coupled with the variety of input sources (such as via an IP network) to aggregate data. Data aggregation policies (sampling interval, announcement interval, etc.) can be configurable with respect to a given location. In some embodiments, the data aggregation engine 126 receives data through input interfaces 102 and organizes data into data structures. This organizing can include aggregating sensor measurements. Aggregating sensor measurements can include processing sensor measurements to obtain one or more data points or values and combining the measurements with similar data. For example, audio can be processed to determine languages spoken by a set of speakers. This languages measurement can then be combined with a measurement of languages identified from images (such as on T-shirts or books).

A privacy engine can operate to protect user identity. For example, users can opt in to allow their devices to exchange a challenge/response with the public announcement system to generate One-Time-Unique-HASH (OTUH) that is valid for a specific period of time. This OTUH can be used as an identifier rather than a user's personal information. In another embodiment, the privacy engine can enforce data destruction policies.

An inference engine can identify characteristics in aggregated data. In one embodiment, the inference engine performs a rule based inference by co-relating the data across various sources. For example, visually, a person may appear to be Asian, but the person may be a third-generation American who prefers U.S. English as their preferred language. The inference engine can identify and/or mitigate such conflicting scenarios using the data, rules, user opt-in preferences, etc. (i.e., using multi-sensor assertion based processing). In case of a conflict of sensor assertion, the inference engine may use rule-based logic to resolve the conflict. As an example, a lowest common denominator can be taken or an assertion score can be assigned to sensors based on a confidence of assertions in the past.

A characteristics ranking engine ranks the identified characteristics of the content. For example, a characteristic item can include language. Based on various languages observed in a given sample interval, this engine can sort and/or rank them. Other sensed characteristics (volume, speed, dialect, etc.) can also be ranked.

A recommendation engine can use the ranking of characteristics from the ranking engine in a content delivery sub-system. For example, characteristics include language, volume, speed (i.e., speed of speech among users) and other properties.

Adaptive feedback can be used to improve operations of the engines. For example, based on the adaptive feedback received from one or more input sources, the recommendation engine can provide alternate options to a public announcement system.

Other engines are also possible to integrate with the processing system 106. For example, a dynamic translation system can be used in conjunction with the recommendation engine 134. In another example, a cultural rule checker can work with the recommendation engine to perform checks on a choice of words when dynamic translation is involved to avoid improper cultural language use (e.g., context sensitive references, innuendo, etc.).

The systems described above can use enabling technologies for characteristics identification and inference and provide recommendations. Technologies can include perceptual computing, linguistic profiling, facial profiling and accent classification.

Perceptual computing can be integrated with the described systems. Perceptual computing technology describes interactions with computers/automated systems in terms of intuitiveness, natural engagement and inter-system communication. For example, the data aggregation engine can use perceptual computing techniques for speech recognition, facial analysis, mobile device interaction with the public announcement system, etc.

Linguistic profiling can be integrated with the described systems. Linguistic profiling systems can identify social characteristics of an individual based on auditory cues, including dialect and accent. For example, raw data sent from the sensors or from devices about which kind of audio data, or audio sensory data, indicate preferences that users selected through their mobile devices. In addition, mobile applications that they use can be detected using their language of choice. For example, a user from India is detected using a native Indian language-based app to interact with the airline system. This detection provides an input that can be used by the linguistic profiling component to understand a preference of language.

Facial profiling can be integrated with the described systems. This technology can identify gender, age, a user's attention on a given signage, etc., based on facial profile image data (including still images or video images). For example, facial profiles can be captured using IP cameras and a facial profiling system can provide inferences from the data.

Accent classification can be integrated with the described systems. Accent classification allows classification of foreign accented speech in order to determine the origins/ethnicity of a speaker. For example, a non-native English speaker can be identified by speech patterns. The speech patterns can then be analyzed for an accent origin.

Figure 2:
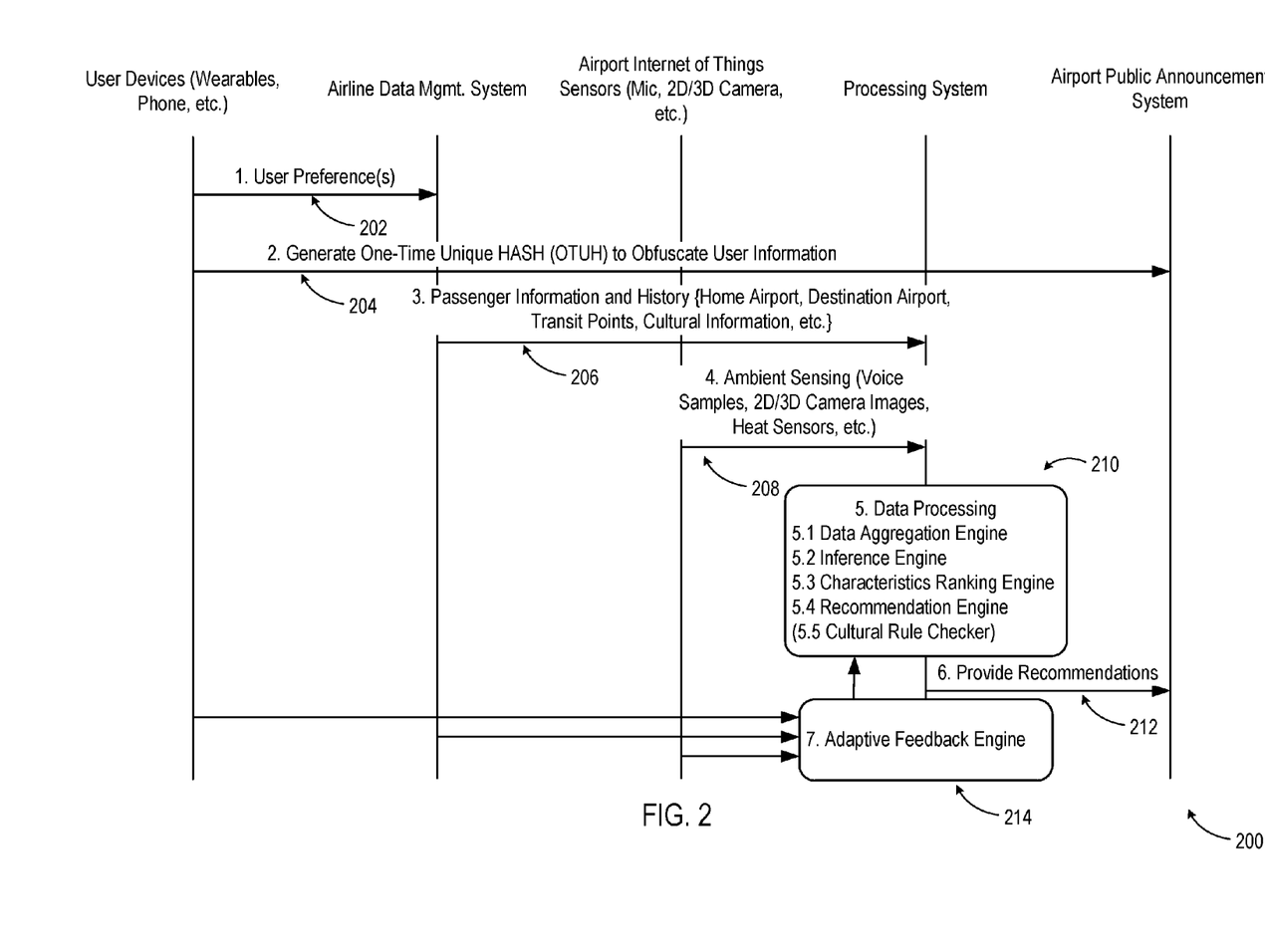
FIG. 2 is an operational flow diagram illustrating a public announcement system consistent with embodiments disclosed herein.

FIG. 2 is an operational flow diagram illustrating a public announcement system consistent with embodiments disclosed herein. It should be recognized that the system described is an example embodiment and that operations can be reordered, operated in parallel and/or omitted, depending on the embodiment.

In operation 202, a user device provides preference information to an airline data management system. In operation 204, a user device generates an OTUH with the airport public announcement system to use in communication with the public announcement system. With the OTUH, user preferences can be provided while obfuscating user information, such as true identity. In operation 206, the airline management system provides current and historical passenger information to the processing system. In operation 208, sensors provide sensor data to the processing system. In operation 210, the processing system uses acquired data to create recommended public announcement information. In operation 212, recommendations are provided to the public announcement system. The recommendation can include the public announcement itself (e.g., audio data, video data or device messaging data) or the characteristics of the public announcement. In operation 214, user devices, airline management systems and sensors can provide feedback about a success or failure of a public announcement based on the recommendations. For example, an airline management system can notify the public announcement system that an identified passenger did not show up after the message was broadcast.

In operation 210, multiple systems can work together to produce a recommendation. The user preferences, passenger information, passenger historical information, and sensor information are processed by the data aggregation engine to provide data structures for use by the inference engine. The inference engine processes the data structures to infer characteristics about the aggregated data (such as language, volume, dialect, speed, etc.). A characteristics rating engine determines importance of the inferred characteristics and ranks the characteristics by importance. Importance can be based in part on a number of people sharing a characteristic, intended audience or other configurations. A recommendation engine can take the ranked characteristics and provide a recommendation for a public announcement. In some embodiments, a cultural rule checker is used to avoid recommendations that would be culturally insensitive (such as unintended innuendo).

In some embodiments, the processing system can be provided as a service. For example, operation 210 can be provided by a network service. The network service can be operated separately from the airport public announcement system. In some embodiments, the network service can service multiple public announcement systems. Recommendations, including data or audio, can be transmitted to a requesting public announcement system through an application programming interface (API).

In one example, the processing system obtains input from a variety of sources including user devices (e.g., wearables, phone, tablet, etc.). Input can also include opt-in user preferences, airline data management systems with flight and/or passenger information and ambient sensors deployed across a geographic area. Users concerned about privacy can opt in to perform a secure exchange challenge/response protocol with the announcement system using an OTUH. The processing system aggregates, infers and characterizes user demographic information relating to the identified geographic area. Based on the ranking of the identified characteristics, a recommendation engine provides recommendations to the public announcement system. A cultural rule checker can be used to avoid incorrect verbiage for any dynamic translation.

The processing system obtains feedback from input elements to compare a response with the recommended options. For example, for announcements made in the top three languages, if 95% of the people have showed up at the gate, then the processing system can go further down a recommendation list (e.g., the next few languages) to determine if the public announcement system can get the attention of the remaining 5% of the people.

Figure 3:
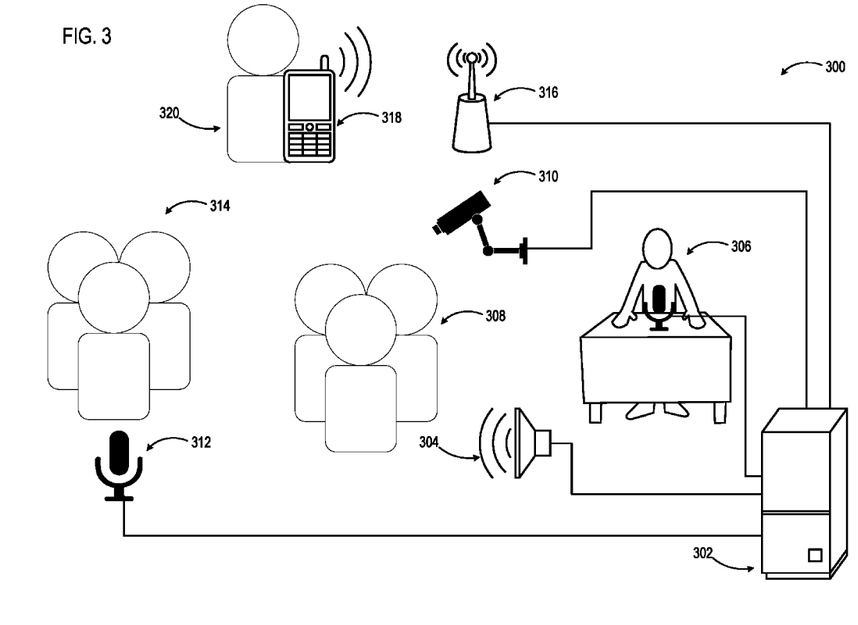
FIG. 3 is a system diagram of a public announcement system consistent with embodiments disclosed herein.

FIG. 3 is a system diagram of a public announcement system consistent with embodiments disclosed herein. A processing system 302 obtains input information from sensors including microphone 312 and camera 310. Microphone 312 obtains audio information about group 314 (such as by linguistic profiling). Camera 310 obtains information about group 308 (such as by facial profiling). A user device 318 can provide preferences of a user 320 with processing system 302 through interfaces such as wireless interface 316. An agent 306 or system can provide announcement information to processing system 302 (such as text, audio, or other input) to address groups 314 and/or 308 and/or user 320. The processing system 302 can use prior and/or current aggregated data to infer characteristics of the groups 314 and/or 308 and/or user 320, rank the characteristics and provide a recommendation for a public announcement. Using the recommendations, a public announcement is formed and provided to a content delivery system. In some embodiments, the public announcement is provided over a public address system 304 as sound via speakers. In other embodiments, announcements addressed to individuals can be provided to their mobile devices 318 via a wireless interface 316. In some embodiments, both the public address system 304 and wireless interface 316 are used. In some embodiments, the content delivery sub-system adapts content that may involve dynamic translation before delivering the content. In one embodiment, the gathered data is sanitized and/or securely deleted to preserve privacy.

Figure 4:
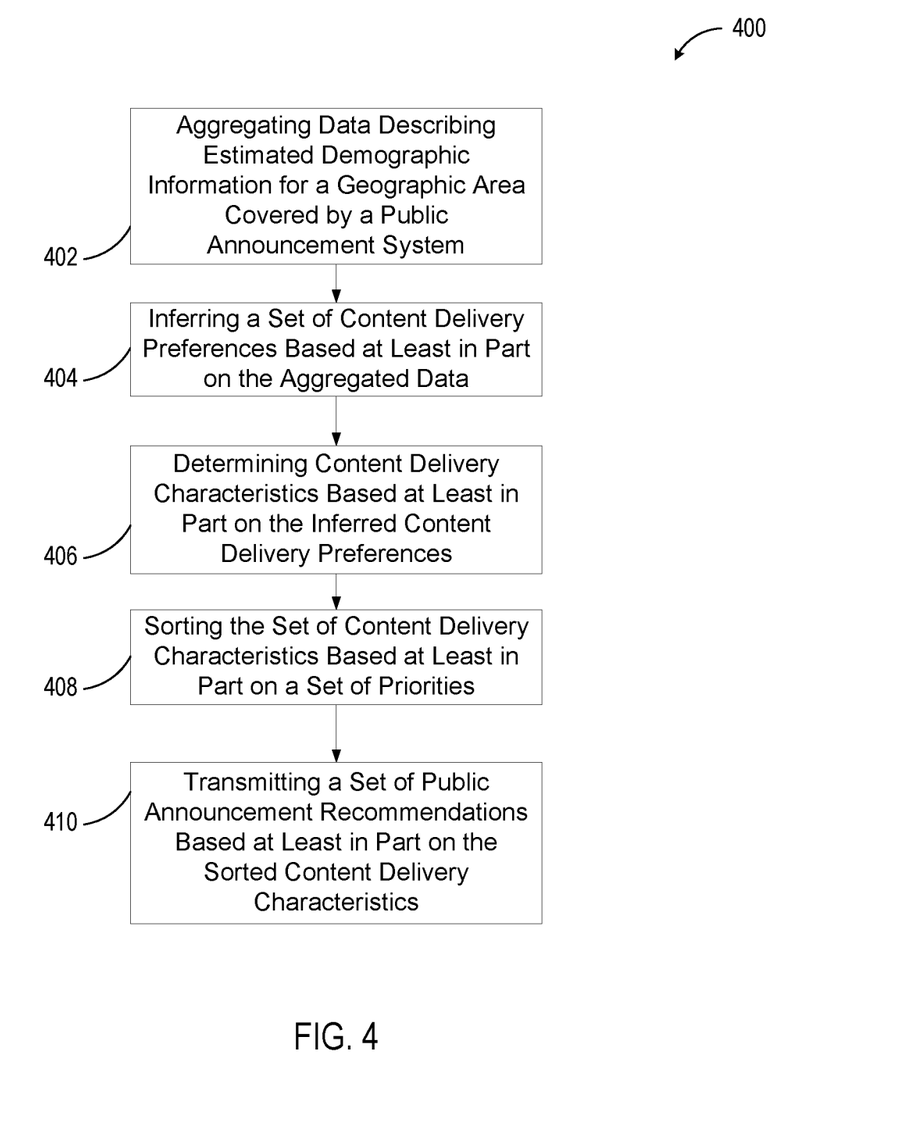
FIG. 4 is a flow chart illustrating a method for identifying user preferences for public announcements consistent with embodiments disclosed herein.

FIG. 4 is a flow chart illustrating a method 400 for identifying user preferences for public announcements consistent with embodiments disclosed herein. The method 400 can be performed by a system, such as that shown in FIG. 1, including input interfaces 102, a data aggregation engine 126, a privacy engine 128, an inference engine 130, a characteristics ranking engine 132, a recommendation engine 134, adaptive feedback 136 and content delivery system 108. In block 402, the processing system aggregates data describing estimated demographic information for a geographic area covered by a public announcement system. In block 404, the processing system infers a set of content delivery preferences based at least in part on the aggregated data. In block 406, the processing system determines content delivery characteristics based at least in part on the inferred content delivery preferences. In block 408, the processing system sorts the set of content delivery characteristics based at least in part on a set of priorities. In block 410, the processing system transmits a set of public announcement recommendations based at least in part on the sorted content delivery characteristics.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 5:
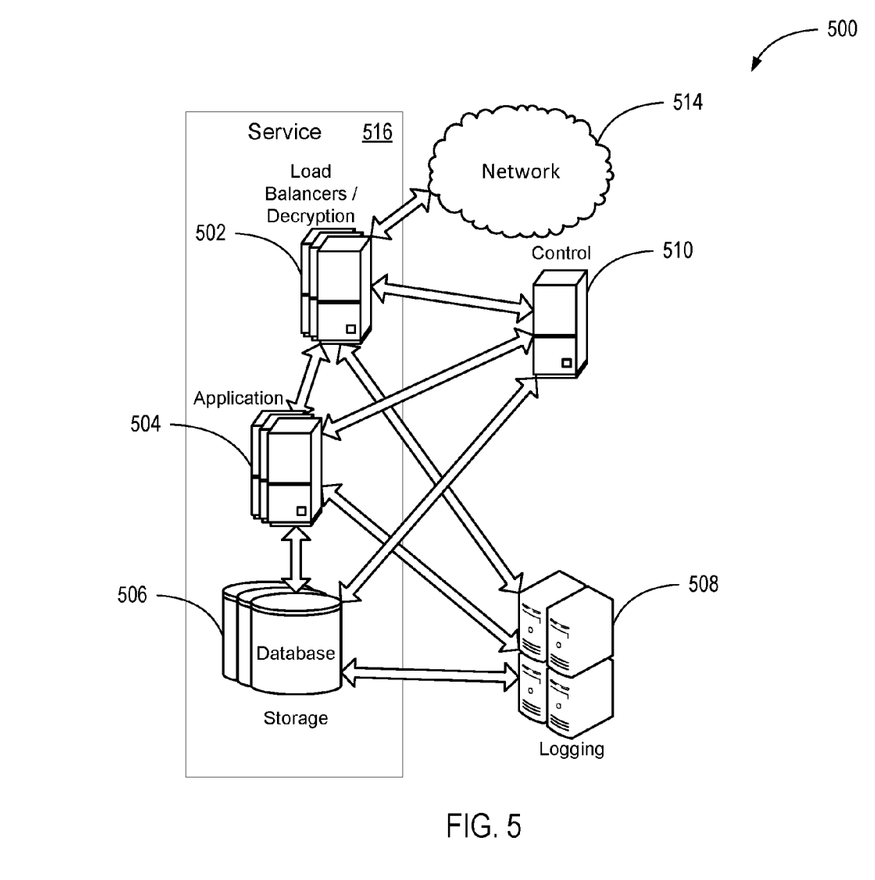
FIG. 5 is a system diagram illustrating a network service to identify geographic population preferences for public announcements consistent with embodiments disclosed herein.

FIG. 5 is a system diagram illustrating a system 500 configured to provide services to a PA system consistent with embodiments disclosed herein. A PA system can communicate with a service 516 over the Internet 514. The announcement preference service 502 can include load balancers 502 capable of decryption, application servers 504, storage 506, control servers 510 and/or logging server 508. Load balancers 502 can receive requests from public announcement systems and format the requests to be received by application servers 504. Application servers 504 can receive data from the public announcement systems, cause data to be stored by data servers 506 and provide inferences for announcement preferences from the data. The application servers 504 can provide results (such as announcement preferences, announcement text, audio for broadcasting, privacy services, etc.) to the load balancers 502 which transmit the results to the public announcement systems. Database servers 506 can store data regarding the sensor inputs, direct user preferences, data feed information and/or account information. A control server 510 can monitor systems of the service 516 and/or cause servers to be added to pools of servers (such as load balancers 502, application servers 504 and/or database servers 506). The control server 510 can also provide data integrity/redundancy services such as causing snapshotting, caching and/or other features. A logging service 508 can track usage and operations performed by the service 516 and on behalf of the service.

In one example, an administrator can set up an account with service 516 using a public announcement application. The administrator registers an account with service 516 and provides the public announcement application with the credentials. The service 516 can store user credentials in storage 506. The public announcement application can then communicate securely with the public announcement service using the stored credentials.

Figure 6:
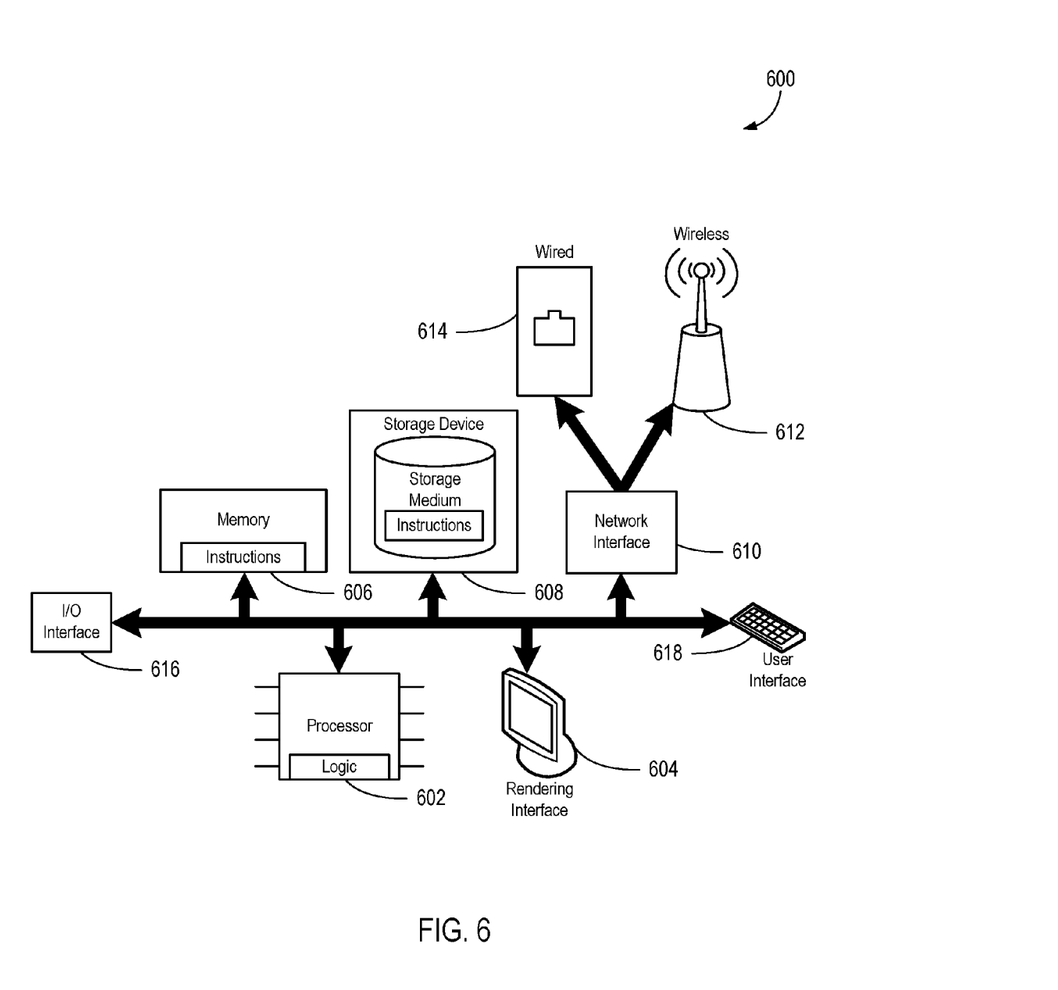
FIG. 6 is a schematic diagram of a computing system consistent with embodiments disclosed herein.

FIG. 6 is a schematic diagram of computing system 600. Computing system 600 can be viewed as an information passing bus that connects various components. In the embodiment shown, computing system 600 includes processor 602 having logic 602 for processing instructions. Instructions can be stored in and/or retrieved from memory 606 and storage device 608 that includes a computer-readable storage medium. Instructions and/or data can arrive from network interface 610 that can include wired 614 or wireless 612 capabilities. Instructions and/or data can also come from I/O interface 616 that can include such things as expansion cards, secondary buses (e.g., USB, etc.), devices, etc. A user can interact with computing system 600 though user interface devices 618 and rendering system 604 that allows the computer to receive and provide feedback to the user.

EXAMPLES

Example 1 is a system for providing public announcements. The system includes a variety of sensors designed to provide sensor data regarding a population in a geographic area. The system also includes a data feed interface designed to receive feed data from a management system which describes population attributes in the geographic area. The system further includes a data aggregation engine designed to create aggregated data describing population characteristics in the geographic area from the sensor data and feed data. It further includes an inference engine designed to receive the aggregated data and estimate content delivery preferences for the geographic area through rule-based inference that includes correlating the population characteristics included in the aggregated data. The system also includes a characteristic ranking engine designed to receive the content delivery preferences and provide sorted content delivery preferences based on a set of priorities, and a recommendation engine configured to receive the sorted content delivery preferences and transmit a recommendation to a public announcement system. The recommendation includes a set of announcement characteristics based in part on the sorted content delivery preferences. Finally, the system includes a public announcement system. The public announcement system receives the recommendation, prepares a content transmission based on the set of announcement characteristics, and transmits the content transmission for presentation on one or more content delivery systems or personal devices.

Example 2 includes the system of Example 1, where the public announcement system is further designed to select the audio transmission from a set of audio transmissions that most closely matches the announcement characteristics.

Example 3 includes the system of Example 2, where the public announcement system is also designed to process the selected audio transmission to match one or more of the announcement characteristics.

Example 4 includes the system of Example 3, where to prepare the audio transmission contains an audio transmission from text to speech.

Example 5 includes the system of Example 1 and a cultural rule checking system designed to monitor dynamic translations for a set of rejected words or rejected phrases.

Example 6 includes the system of Example 1, where the public announcement system is mounted in a transportation terminal.

Example 7 includes the system of Example 1, where the public announcement system is mounted in an office area, store, airport, train station, bus station, concert venue or theater.

Example 8 includes the system of any of Examples 1-7, where the sensor data includes visual information.

Example 9 includes the system of Example 8, where the visual information is processed for facial recognition and classification.

Example 10 includes the system of any of Examples 1-8, where the data aggregation engine receives audio information in the sensor data.

Example 11 includes the system of Example 10, where the data aggregation engine includes a language detection system that receives the audio information.

Example 12 includes the system of Example 10, where the data aggregation engine also contains an accent detection system that receives the audio information.

Example 13 includes the system of Example 10, where the data aggregation engine further contains a speech delivery characteristic detection system that receives the audio information.

Example 14 includes the system of Example 13, where the speech delivery characteristics include speech rate.

Example 15 includes the system of Example 13, where the speech delivery characteristics include volume information.

Example 16 includes the system of Example 13, where the speech delivery characteristics include speech content information.

Example 17 includes the system of any of Examples 1-16, including an adaptive feedback system designed to receive a success measurement of the audio transmission and adjust recommendations.

Example 18 includes the system of any of Examples 1-17, where the feed data contains passenger characteristics.

Example 19 includes the system of Example 18, where passenger characteristics include city of origin, home town, destination city, passport information, or languages spoken.

Example 20 includes the system of any of Examples 1-19, together with a device interface which is designed to receive data from a device data feed, including individual preferences.

Example 21 includes the system of any of Examples 1-20, together with a device interface designed to receive data from a device, including context data.

Example 22 includes the system of Example 20, together with a privacy engine designed to receive individual preferences and provide the individual preferences to the data aggregation engine.

Example 23 includes the system of Example 20, where the privacy engine is designed to exchange challenge/response with the PA system to generate One-Time-Unique-HASH (OTUH) that is valid for a specific period of time.

Example 24 is a device for content transmission customization. The content transmission customization includes a sensor interface, a data aggregation engine, an inference engine, a characteristic ranking engine, and a recommendation engine. The sensor interface is designed to receive sensor data from sensors providing data describing a population in the geographic area. The data aggregation engine is designed to create aggregated data describing population characteristics in the geographic area from sensor data and feed data. The inference engine is designed to utilize the aggregated data to estimate content delivery preferences for the geographic area through a rule-based inference that includes correlating the population characteristics included in the aggregated data. The characteristic ranking engine is designed to receive the content delivery preferences and provide sorted content delivery preferences based on a set of priorities. The recommendation engine is designed to receive the sorted content delivery preferences and transmit a recommendation to a content delivery system. The recommendation contains a set of content characteristics for a content transmission based in part on the sorted content delivery preferences.

Example 25 includes the device of Example 24, where the recommendation engine also contains a perceptual computing component designed to measure reception of the content transmission based on the recommendation.

Example 26 includes the device of Example 24, where the data aggregation engine further contains a linguistic profiling component designed to correlate audio data with inferred language preferences of one or more population members.

Example 27 includes the device of Example 26, where the linguistic profiling component is also designed to provide accent classification of one or more population members.

Example 28 includes the device of any of Examples 24-27, together with a content delivery system designed to receive the recommendation and announcement data and provide public announcement content based in part on the recommendation and announcement content for the content transmission.

Example 29 includes the device of any of Examples 24-27, where the content delivery system includes a dynamic translation component designed to translate content for the content transmission from a first language to a second language based in part on the recommendation.

Example 30 includes the device of any of Examples 24-27, together with a data destruction system designed to verify that data identifying individuals of the population is destroyed after use by the data aggregation engine.

Example 31 is a method of providing a public announcement. The public announcement includes aggregating data describing estimated demographic information for a geographic area covered by a public announcement system; inferring a set of content delivery preferences based in part on the aggregated data; determining content delivery characteristics based in part on the inferred content delivery preferences; sorting the set of content delivery characteristics based in part on a set of priorities; and transmitting a set of public announcement recommendations based in part on the sorted content delivery characteristics.

Example 32 includes the method of Example 31, where the set of priorities includes a weighting of inferred delivery preferences based in part on a size of a subgroup of a population in the geographic area.

Example 33 includes the method of Example 31, where the set of priorities includes a weighting of a shared characteristic based in part on a size of a subgroup of a population in the geographic area.

Example 34 includes the method of Example 33, where the shared characteristic is membership within a passenger list.

Example 35 includes the method of Example 31, together with receiving a success measurement of the public announcement recommendations and applying the success measurement to adjust inferences from the aggregated data.

Example 36 includes the method of Example 31, together with receiving preference data from a device to include in the demographic information.

Example 37 includes the method of Example 36, where receiving preference data from a device also includes exchanging a challenge/response with the device to generate a one-time-unique-hash (OTUH) that is valid for a specific period of time, and using the OTUH to receive preference data from the device.

Example 38 is an apparatus containing ways to perform a method as shown in any of Examples 31-37.

Example 39 is a machine-readable storage including machine-readable instructions, that when executed implements a method or realize an apparatus as shown in any of Examples 31-37.

Example 40 is a computer-readable storage medium. The computer-readable storage medium contains instructions that, when executed by a computing device, cause the computing device to aggregate data describing estimated demographic information for a geographic area covered by a public announcement system, infer a set of content delivery preferences based in part on the aggregated data, determine content delivery characteristics based in part on the inferred content delivery preferences, sort the set of content delivery characteristics based in part on a set of priorities, and transmit a set of public announcement recommendations based in part on the sorted content delivery characteristics.

Example 41 includes the computer-readable storage medium of Example 40, where the set of priorities contains a weighting of inferred delivery preferences based in part on a size of a subgroup of a population in the geographic area.

Example 42 includes the computer-readable storage medium of Example 40, where the set of priorities contains a weighting of a shared characteristic based in part on a size of a subgroup of a population in the geographic area.

Example 43 includes the computer-readable storage medium of Example 42, where the shared characteristic is membership within a passenger list.

Example 44 includes the computer-readable storage medium of Example 40 and method designed to receive a success measurement of the public announcement recommendations, and apply the success measurement to adjust inferences from the aggregated data.

Example 45 includes the computer-readable storage medium of Example 40 and method further designed to receive preference data from a device to include in the demographic information.

Example 46 includes the computer-readable storage medium of Example 45, where receiving preference data from a device also includes a challenge/response with the device to generate a One-Time-Unique-HASH (OTUH) that is valid for a specific period of time, and uses the OTUH to receive preference data from the device.

Example 47 is a system for providing public announcements. The system for providing public announcements includes (1) a process for sensing characteristics of a population in a geographic area; (2) a process for receiving feed data from a management system describing population attributes in the geographic area; (3) a process for creating aggregated data describing population characteristics in the geographic area from the sensor data and feed data; (4) a process for receiving the aggregated data and estimating content delivery preferences for the geographic area through rule-based inference that includes correlating the population characteristics included in the aggregated data; (5) a process for receiving the content delivery preferences, and providing sorted content delivery preferences based on a set of priorities, and (6) a process receiving the sorted content delivery preferences and transmitting a recommendation to a public announcement system. The recommendation includes a set of announcement characteristics based in part on the sorted content delivery preferences.

Example 48 includes the system of Example 47, together with a process for receiving the recommendation and preparing a content transmission based on the set of announcement characteristics.

Example 49 includes the system of Example 48, together with a process for transmitting the content transmission for presentation on one or more of content delivery systems or personal devices.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium (non-transitory or transitory) wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment of the present invention. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of embodiments of the invention. One skilled in the relevant art will recognize, however, that the invention may be practiced without one or more of the specific details, or with other methods, components, materials, etc. In other instances, well-known structures, materials, or operations are not shown or described in detail to avoid obscuring aspects of the invention.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

Those having skill in the art will appreciate that many changes may be made to the details of the above-described embodiments without departing from the underlying principles of the invention. The scope of the present invention should, therefore, be determined only by the following claims.

The invention claimed is:

1. A system for providing public announcements comprising:
a plurality of sensors configured to provide sensor data regarding a population in a geographic area;
a data feed interface configured to receive feed data from a management system, the feed data describing population attributes in the geographic area;
a data aggregation engine configured to create aggregated data describing population characteristics in the geographic area from the sensor data and feed data;
an inference engine configured to receive the aggregated data and estimate content delivery preferences for the geographic area through rule-based inference that includes correlating the population characteristics included in the aggregated data;
a characteristic ranking engine configured to receive the content delivery preferences and provide sorted content delivery preferences based on a set of priorities; and
a recommendation engine configured to receive the sorted content delivery preferences and transmit a recommendation to a public announcement system, the recommendation comprising a set of announcement characteristics based at least in part on the sorted content delivery preferences; and
a public announcement system configured to:
receive the recommendation;
prepare a content transmission based on the set of announcement characteristics; and
transmit the content transmission for presentation on one or more of a content delivery system or a personal device.

2. The system of claim 1, wherein the public announcement system is further configured to select the audio transmission from a set of audio transmissions that most closely matches the announcement characteristics.

3. The system of claim 2, wherein the public announcement system is further configured to process the selected audio transmission to match one or more of the announcement characteristics.

4. The system of claim 3, wherein to prepare the audio transmission further comprises to create an audio transmission from text to speech.

5. The system of claim 1, further comprising a cultural rule checking system configured to monitor dynamic translations for a set of rejected words or rejected phrases.

6. The system of claim 1, wherein the public announcement system is mounted in a transportation terminal.

7. The system of claim 1, wherein the data aggregation engine receives audio information in the sensor data.

8. The system of claim 7, wherein the data aggregation engine further comprises a language detection system that receives the audio information.

9. The system of claim 1, further comprising an adaptive feedback system configured to receive a success measurement of the audio transmission and adjust recommendations.

10. The system of claim 1, further comprising a device interface, the device interface configured to receive data from a device, the device data feed including individual preferences.

11. The system of claim 10, further comprising a privacy engine configured to receive individual preferences and provide the individual preferences to the data aggregation engine.

12. The system of claim 10, wherein the privacy engine is configured to exchange challenge/response with the PA system to generate One-Time-Unique-HASH (OTUH) that is valid for a specific period of time.

13. A device for content transmission customization comprising:
a data feed interface configured to receive feed data from a management system describing population attributes in the geographic area;

a sensor interface configured to receive sensor data from sensors providing data describing a population in the geographic area;

a data aggregation engine configured to create aggregated data describing population characteristics in the geographic area from sensor data and feed data;

an inference engine configured to utilize the aggregated data to estimate content delivery preferences for the geographic area through a rule-based inference that includes correlating the population characteristics included in the aggregated data;

a characteristic ranking engine configured to receive the content delivery preferences and provide sorted content delivery preferences based on a set of priorities;

a recommendation engine configured to receive the sorted content delivery preferences and prepare a recommendation of content, the recommendation comprising a set of content characteristics for a content transmission based at least in part on the sorted content delivery preferences, a content delivery system configured to:
  process the recommendation; and
  prepare a content message based on the set of announcement characteristics;

a public announcement system interface configured to provide the content message to a public announcement system for presentation on one or more of a content delivery system or a personal device.

14. The device of claim 13, wherein the recommendation engine further comprises a perceptual computing component configured to measure reception of the content transmission based on the recommendation.

15. The device of claim 13, wherein the data aggregation engine further comprises a linguistic profiling component configured to correlate audio data with inferred language preferences of one or more population members.

16. The device of claim 15, wherein the linguistic profiling component is further configured to provide accent classification of the one or more population members.

17. The device of claim 13, further comprising a data destruction system configured to verify that data identifying individuals of the population is destroyed after use by the data aggregation engine.

18. At least one non-transitory computer readable storage medium having stored thereon instructions that, when executed by a computing device, cause the computing device to:
  aggregate data describing estimated demographic information for a geographic area covered by a public announcement system;
  infer a set of content delivery preferences based at least in part on the aggregated data;
  determine content delivery characteristics based at least in part on the inferred content delivery preferences;
  sort the set of content delivery characteristics based at least in part on a set of priorities;
  compute a set of public announcement recommendations based at least in part on the sorted content delivery characteristics;
  prepare a content message based on the set of public announcement recommendations; and
  provide the content message to a public announcement system for presentation on one or more of a content delivery system or a personal device.

19. The non-transitory computer readable storage medium of claim 18, wherein the set of priorities includes a weighting of inferred delivery preferences based at least in part on a size of a subgroup of a population in the geographic area.

20. The non-transitory computer readable storage medium of claim 18, wherein the set of priorities includes a weighting of a shared characteristic based at least in part on a size of a subgroup of a population in the geographic area.

21. The non-transitory computer readable storage medium of claim 20, wherein the shared characteristic is membership within a passenger list.

22. The non-transitory computer readable storage medium of claim 18, wherein the method further comprises to:
  receive a success measurement of the public announcement recommendations; and
  apply the success measurement to adjust inferences from the aggregated data.

23. The non-transitory computer readable storage medium of claim 18, wherein the method further comprises to receive preference data from a device to include in the demographic information.

* * * * *